United States Patent
Chou et al.

(10) Patent No.: US 8,111,507 B2
(45) Date of Patent: Feb. 7, 2012

(54) ADJUSTMENT MODULE

(75) Inventors: Yu-Cheng Chou, Taipei Hsien (TW); Jin-Xin Wang, Shenzhen (CN); Jun-Wu Duan, Shenzhen (CN); Fan Zhou, Shenzhen (CN); Ben-Gui Long, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 322 days.

(21) Appl. No.: 12/539,768

(22) Filed: Aug. 12, 2009

(65) Prior Publication Data

US 2010/0157564 A1    Jun. 24, 2010

(30) Foreign Application Priority Data

Dec. 23, 2008  (CN) .......................... 2008 1 0306487

(51) Int. Cl.
*G06F 1/16*    (2006.01)
*H05K 5/00*    (2006.01)
*H05K 7/00*    (2006.01)

(52) U.S. Cl. .............................. 361/679.27; 361/679.02

(58) Field of Classification Search ............. 361/679.27, 361/679.02, 679.04, 752
See application file for complete search history.

(56) References Cited

U.S. PATENT DOCUMENTS

| 7,413,150 B1 * | 8/2008 | Hsu .......................... 248/123.11 |
| 2004/0056161 A1 | 3/2004 | Ishizaki et al. |
| 2006/0118680 A1 * | 6/2006 | Yen .............................. 248/121 |
| 2006/0219849 A1 * | 10/2006 | Chiu .......................... 248/125.8 |

FOREIGN PATENT DOCUMENTS

| CN | 2842155 Y | 11/2006 |
| CN | 201131103 Y | 10/2008 |

* cited by examiner

*Primary Examiner* — Yuriy Semenenko
(74) *Attorney, Agent, or Firm* — Altis Law Group, Inc.

(57) ABSTRACT

An adjustment module includes a frame, a sliding member, at least one coiled spring, a pair of guide rails, and a supporting member. The frame includes a main plate. The at least one coiled spring includes an extending portion and a sleeved coiled portion. The guide rails are positioned on opposite sides of the frame. The supporting member is fixed on the frame and has at least one supporting surface. The sliding member is slidably positioned between the guide rails. The coiled portion of the at least one coiled spring is positioned on the at least one supporting surface. An end of the extending portion of the at least one coiled spring is fixed on the sliding member, and an axis of the coiled portion of the at least one coiled spring is substantially perpendicular to the main plate.

10 Claims, 5 Drawing Sheets

ADJUSTMENT MODULE

BACKGROUND

1. Technical Field

The present disclosure relates to an adjustment module employed in a liquid crystal display.

2. Description of the Related Art

One important feature of widely used liquid crystal displays (LCDs) is flexibility. A display with the display frequently adjusted with respect to the supporting surface via an adjustment module. A commonly used adjustment module employed in an LCD generally includes a base, two guide rails, a sliding member, a shaft, and a coiled spring.

The base generally includes a main plate and two side plates. Two side plates cooperatively define a receiving cavity to receive the coiled spring. The coiled spring includes a coiled portion and an extending portion extending therefrom.

During assembly, the coiled portion is positioned on the shaft, and the shaft is fixed on the base. An end of the extending portion of the coiled spring is fixed on the sliding member. The guide rails are positioned on the side plates adjacent to the main plate. A portion of the sliding member is received in the guide rails and slidable relative to the base, thus yielding the adjustment module.

An external force applied to the LCD, moves the sliding member downwards. When the external force is released, a total weight of the LCD and the sliding member is substantially equal to the pull force created by the coiled spring. Therefore, the sliding member can remain in any desired position due to friction between the sliding member and the guide rails.

However, the sliding member has considerable weight and volume, and the extending portion of the coil spring is relatively long. The result is a diameter of the coiled portion being relatively large when the coil spring is in a coiled state. Accordingly, a space of the receiving cavity must be large enough to accommodate the diameter, thus increasing the weight and volume of the base.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
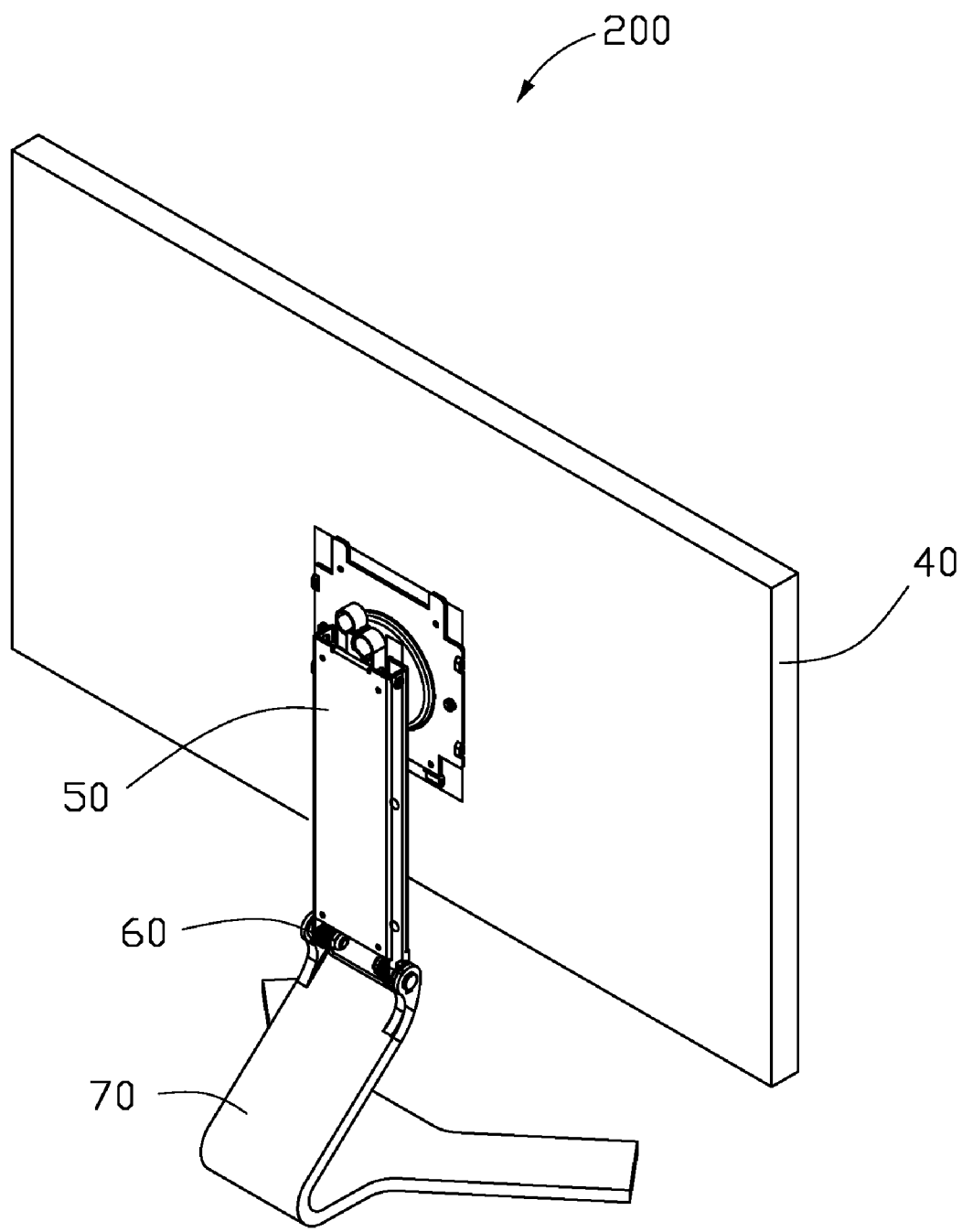
FIG. 1 is an isometric view of an electronic device including an embodiment of an adjustment module.

Referring to FIG. 1, a liquid crystal display 200 includes a display panel 40, an embodiment of an adjustment module 50, a hinge assembly 60, and a base 70. The adjustment module 50 connects the hinge assembly 60 to the display panel 40 and adjusts a distance between the display panel 40 to a supporting surface (not shown) on which the liquid crystal display 200 is situated. The hinge assembly 60 hinges the adjustment module 50 on the base 70.

Figure 2:
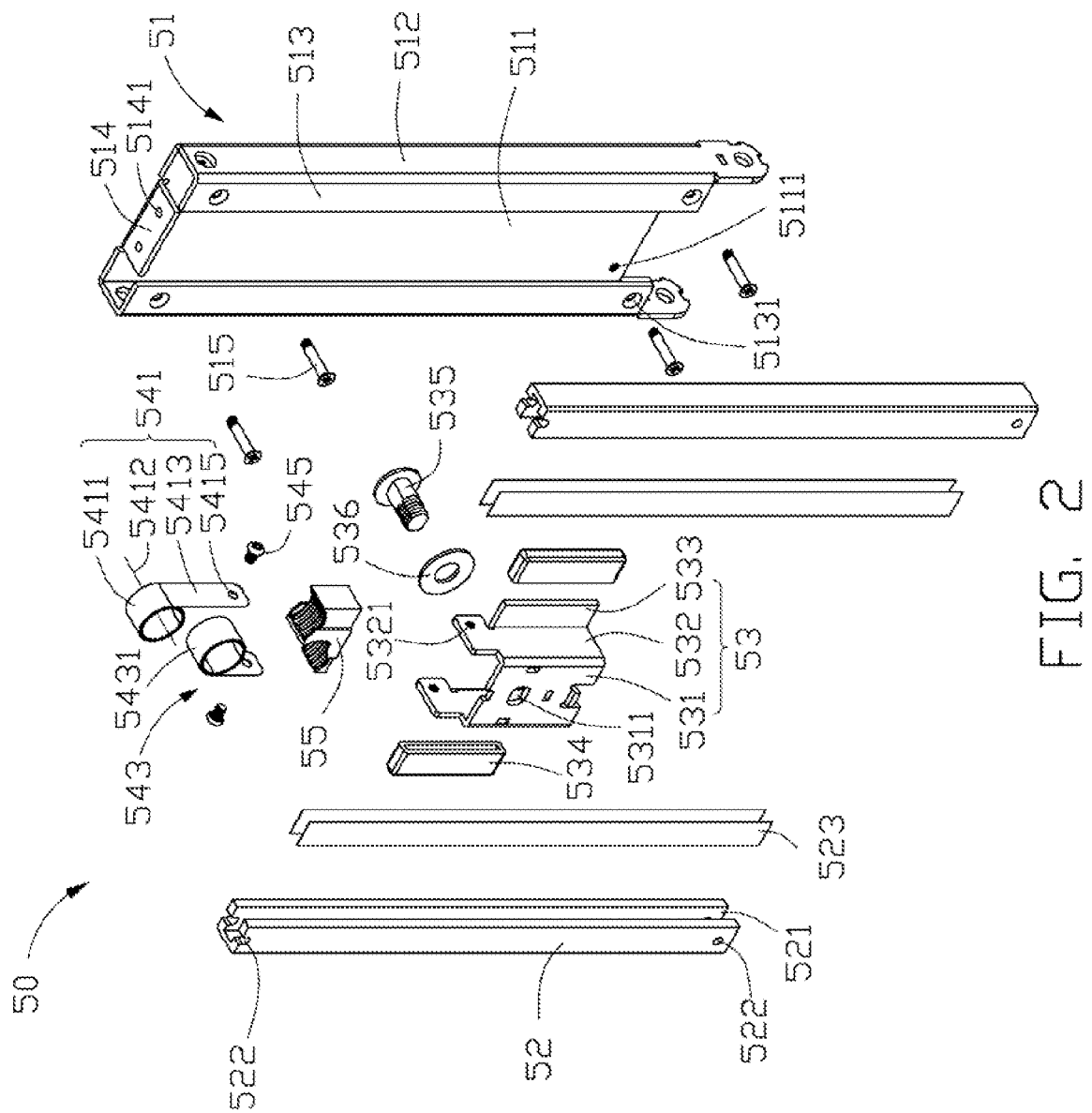
FIG. 2 is an exploded, isometric view of the adjustment module in FIG. 1, the adjustment module including a supporting member.

Referring to FIG. 2, the adjustment module 50 includes a frame 51, a pair of guide rails 52, a sliding member 53, four abrasion resistant sheets 523, two protecting sleeves 534, a shaft 535, a washer 536, a first coiled spring 541, a second coiled spring 543, four first fasteners 515, two second fastener 545, and a supporting member 55.

The frame 51 may be substantially rectangular, and includes a main plate 511 and two side plates 512 extending from opposite sides of the main plate 511.

Each side plate 512 forms a limiting portion 513 on an end away from the main plate 511. Each limiting portion 513 defines two fixing holes 5131 in two ends thereof. The main plate 511 defines four fastener holes 5111 corresponding to the fixing holes 5131 of the limiting portions 513.

An upper end of the main plate 511 forms a supporting plate 514 extending substantially perpendicular from the main plate 511. The supporting plate 514 defines two position holes 5141.

Each guide rail 52 may be substantially rectangular and defines an elongated sliding groove 521 therein. Each guide rail 52 defines two sets of fixing holes 522 therein.

The sliding member 53 includes a main plate 531 and two connecting plates 532. The two connecting plates 532 extend substantially perpendicularly from opposite edges of the main plate 531. The main plate 531 defines a deformed hole 5311. Each connecting plate 532 defines a fastener hole 5321 and forms a sliding portion 533 extending substantially perpendicularly from the main plate 531 on an end away from the main plate 531.

The protecting sleeves 534 are shaped similarly to the sliding portions 533 and may be respectively sleeved on the sliding portions 533 to reduce abrasion of the sliding portions 533.

The first coiled spring 541 includes a coiled portion 5411 and an extending portion 5413. The coiled portion 5411 may be substantially cylindrical and has an axis line 5412. The extending portion 5413 defines a through hole 5415 adjacent to an end of the extending portion 5413.

The second coiled spring 543 has a structure similar to that of the first coiled spring 541 and includes a coiled portion 5431, an extending portion (not labeled), and a through hole (not labeled) defined in the extending portion of the second coiled spring 543.

Figure 3:
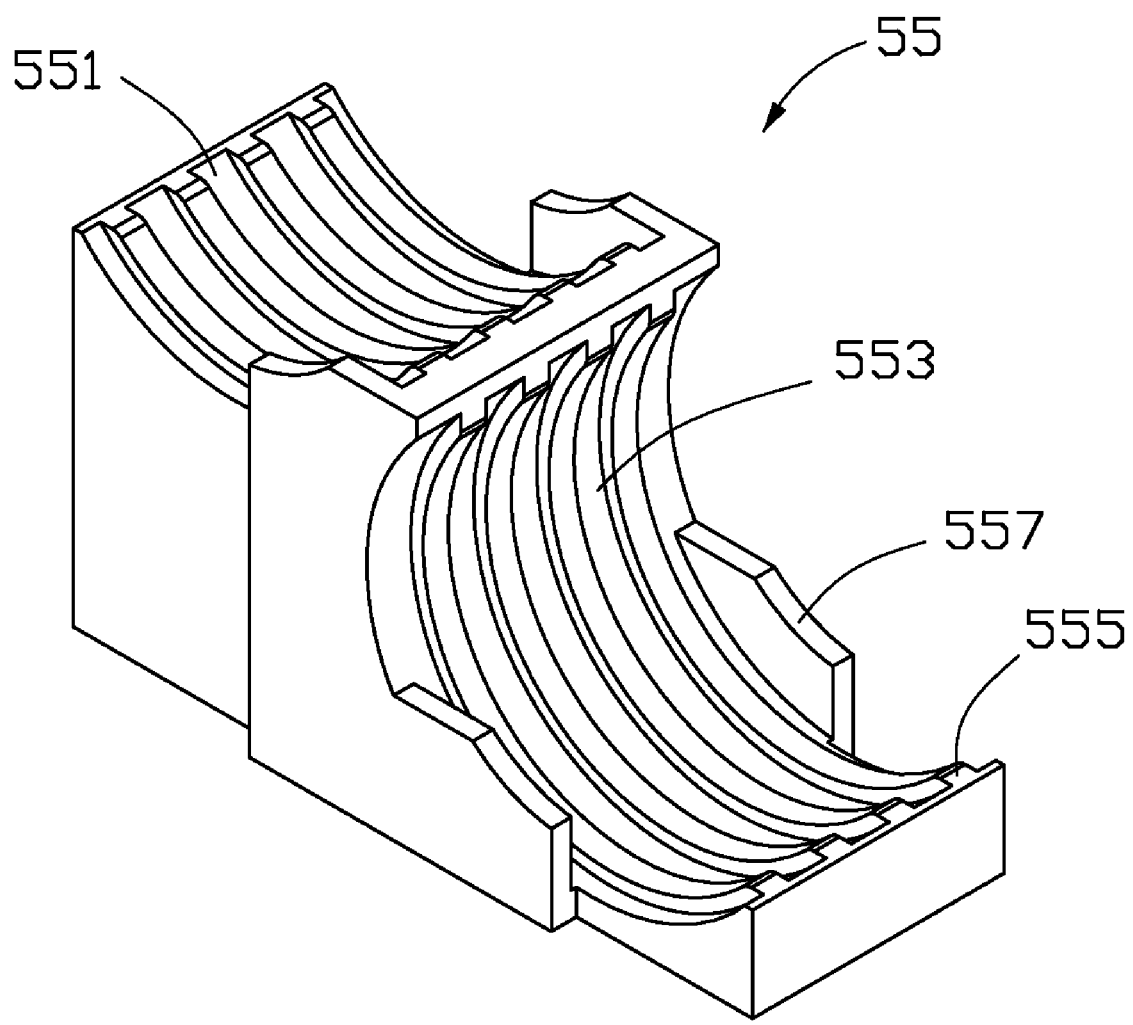
FIG. 3 is an isometric view of the supporting member in FIG. 2.
Figure 4:
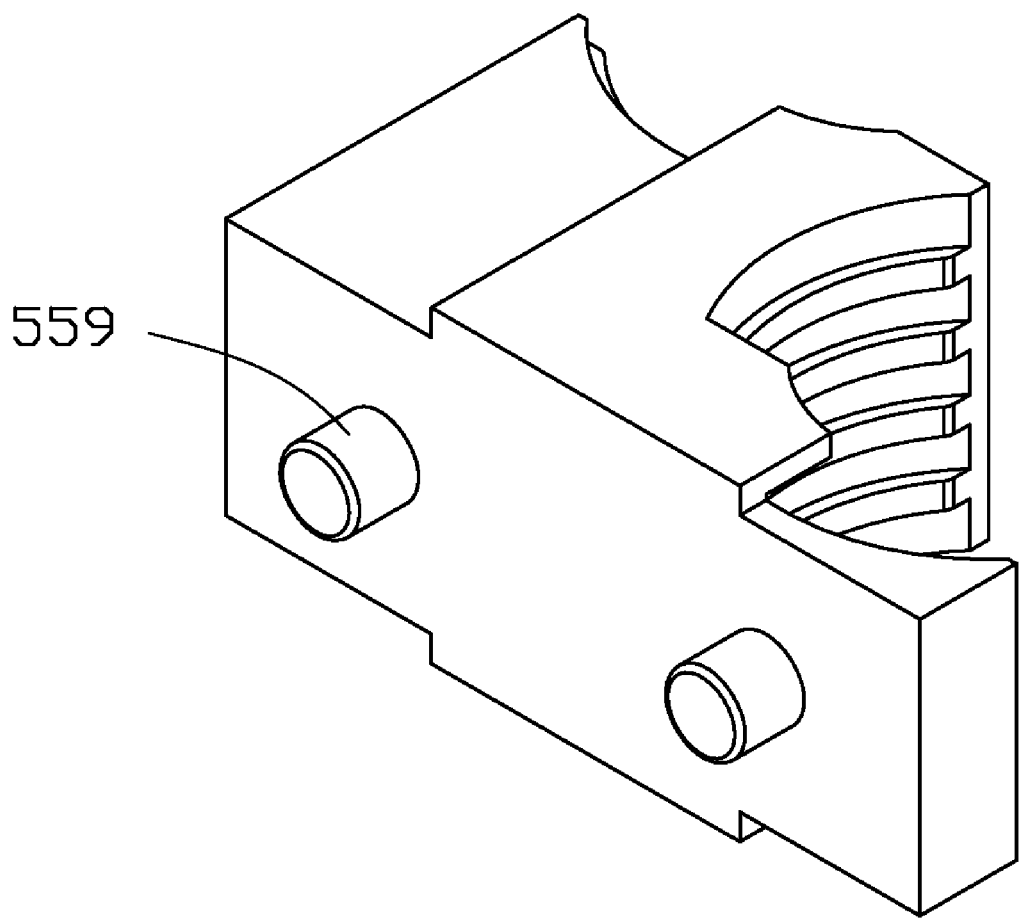
FIG. 4 is similar to FIG. 3, but shown from another aspect.

Referring also to FIGS. 3 and 4, the supporting member 55 may substantially be a block. A top of the supporting member 55 defines a substantially circular first supporting surface 551 to support the coiled portion 5411 of the first coiled spring 541 and a substantially circular second supporting surface 553 to support the coiled portion 5431 of the second coiled spring 543. The first and second supporting surfaces 551, 553 may be substantially tangent, and a height of a bottom of the first supporting surface 551 from a bottom surface of the supporting member 55 may differ from a height of a bottom of the second supporting surface 553.

Furthermore, the supporting member 55 forms a plurality of ribs 555 on the first and second supporting surfaces 551, 553 to reduce friction between the first and second coiled springs 541, 543, and the first and second supporting surfaces 551, 553. The supporting member 55 forms two pairs of limiting portions 557 on a periphery of the first and second supporting surfaces 551, 553 to prevent the first and second coiled springs 541, 543 from detaching from the supporting member 55. Furthermore, the supporting member 55 forms two position pins 559 on the bottom surface thereof to engage with the position holes 5141 of the supporting plate 514 of the frame 51.

Figure 5:
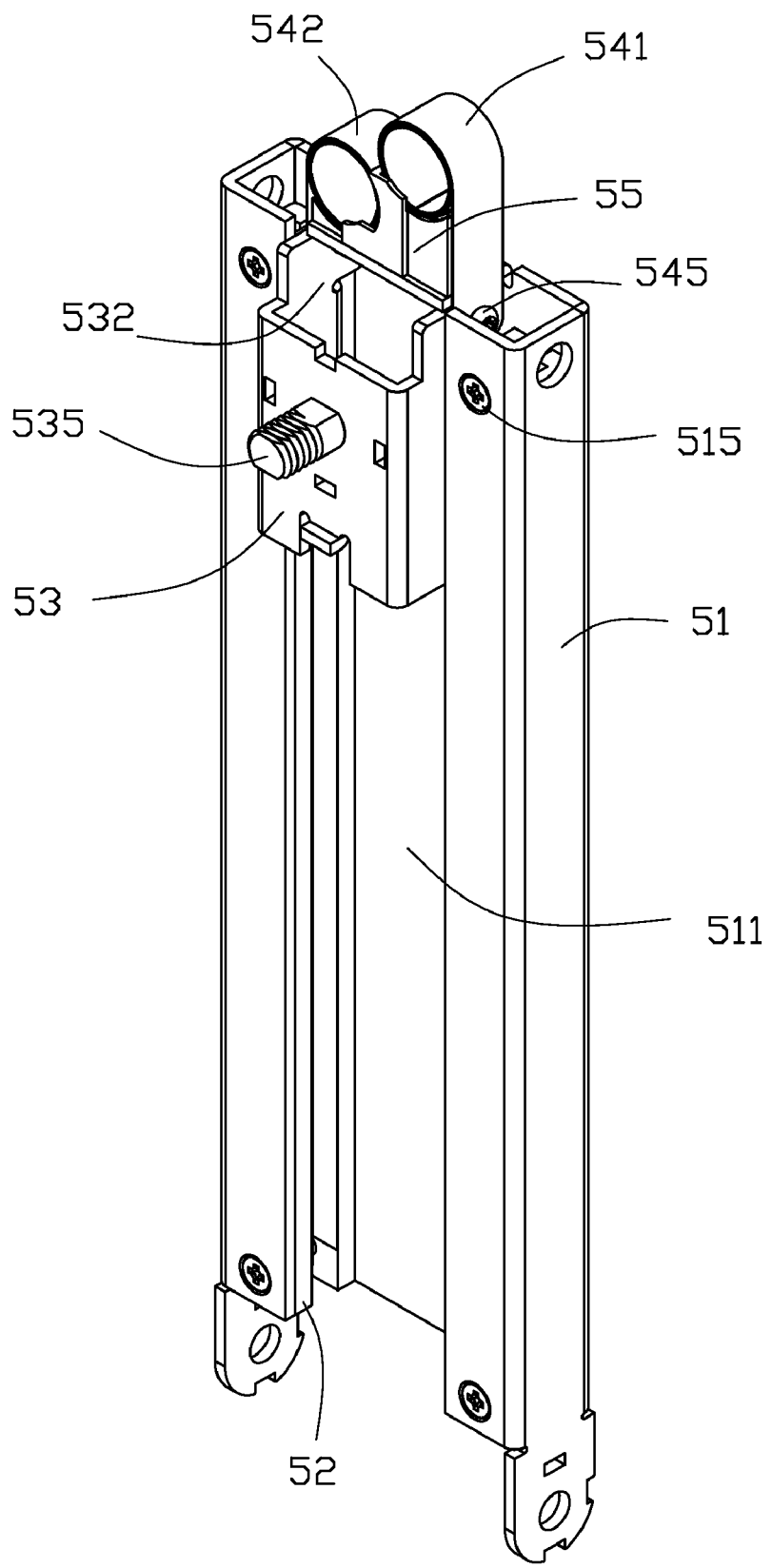
FIG. 5 is an isometric view of the adjustment module in FIG. 2 after assembly.

Referring to FIG. 5, during assembly, the abrasion resistant sheets 523 are fixed on opposite sidewalls of the sliding grooves 521 of the guide rails 52. The guide rails 52 are positioned between the limiting portions 513 of the frame 51 and the main plate 511 of the frame 51, and the first fasteners 515 pass through the fixing holes 5131 of the limiting portion 513 of the frame 51 and the fixing holes 522 of the guide rails 52, and engage with the fastener holes 5111 of the main plate 511 such that the guide rails 52 are fixed on the frame 51.

The shaft 535 passes through the washer 536 and the deformed hole 5311 of the sliding member 53 in that order. The protecting sleeves 534 are sleeved on the sliding portions 533 of the sliding member 53 and the sliding portions 533 are received in the sliding grooves 521 of the guide rails 52 such that the sliding member 53 is between the guide rails 52 and constrained in the frame 51 and slidable relative to the guide rails 52.

The position pins 559 of the supporting member 55 are received in the position holes 5141 of the supporting plate 514 of the frame 51 so that the supporting member 55 is fixed on the supporting plate 514 of the frame 51.

The coiled portion 5411 of the first coiled spring 541 and the coiled portion 5431 of the second coiled spring 543 are positioned on the first supporting surface 551 and the second supporting surface 553 of the supporting member 55 in such a manner that the axis line 5412 is substantially perpendicular to the main plate 511 of the frame 51. The extending portions of the first coiled spring 541 and the second coiled spring 543 are fixed on the connecting plates 532 of the sliding member 53 by the second fasteners 545 received in the through holes 5415 of the extending portions of the first coiled spring 541 and the second coiled spring 543 and the fastener holes 5321 of the sliding member 53.

The display panel 40 is fixed on the shaft 535. The hinge assembly 60 rotatably connects the base 70 to the adjustment module 50, thus yielding the liquid crystal display 200.

A first external force is applied to move the display panel 40 down or up, and the display panel 40 drives the sliding member 53 along the guide rails 52.

A total weight of the LCD and of the sliding member 53 are substantially equal to a pulling force from the first and second coiled springs 541, 543. As a result, the sliding member 53 and the display panel 40 can stop in any desired position by friction between the protecting sleeve 534 and the abrasion resistant sheet 523 after the first external force is relaxed. Therefore, a distance between the display panel 40 and a supporting surface on which the liquid crystal display 200 is disposed can be easily adjusted.

Notably, in this configuration, a thickness of the frame 51 is not effected by a diameter of the coiled portion 5411 of the first coiled spring 541 and the coiled portion 5431 of the second coiled spring 543 because the axis line 5412 of the coiled portion 5411 of the first coiled spring 541 and that of the coiled portion of the second coiled spring 5411 is substantially perpendicular to the main plate 511 of the frame 51, therefore, a thickness of the frame 51 may be reduced. Thus, the volume and weight of the frame 51 and of the adjustment module 20 are reduced.

However, the sliding member has considerable weight and volume, and the extending portion of the coil spring is relatively long. The result is a diameter of the coiled portion being relatively large when the coil spring is in a coiled state. Accordingly, a space of the receiving cavity must be large enough to accommodate the diameter, thus increasing the weight and volume of the base.

It can be understood that the ribs 555 may be omitted. The limiting portions 557 on the supporting member 55 may be replaced by other configurations.

It can also be understood that the guide rails 52 may be integrally formed with the frame 51, and accordingly the side plate 512 and the limiting portion 513 of the frame 51 may be omitted.

Further notably, since the first supporting surface 551 and the second supporting surface 553 are tangent, a width of the adjustment module 50 may be reduced due to the first coiled spring 541 being adjacent to the second coiled spring 543.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. An adjustment module comprising:
   a frame comprising a main plate;
   a sliding member;
   at least one coiled spring comprising an extending portion and a sleeved coiled portion;
   a pair of guide rails positioned on opposite sides of the frame; and
   a supporting member fixed on an end of the frame and having at least one supporting surface, wherein the at least one supporting surface is curved, and the supporting member forms a plurality of ribs on the at least one supporting surface;
   wherein the sliding member is slidably positioned between the guide rails; the coiled portion of the at least one coiled spring is positioned on the at least one supporting surface, and an end of the extending portion of the at least one coiled spring is fixed on the sliding member; and an axis of the coiled portion of the at least one coiled spring is substantially perpendicular to the main plate.

2. The adjustment module of claim 1, wherein the supporting member forms a plurality of limiting portions on a periphery of the at least one supporting surface.

3. The adjustment module of claim 2, wherein the at least one coiled spring comprises a first coiled spring and a second coiled spring, the at least one supporting surface comprises a first supporting surface to support the first coiled spring and a second supporting surface to support the second coiled spring.

4. The adjustment module of claim 3, wherein the first supporting surface and the second supporting surface are tangent.

5. The adjustment module of claim 4, wherein a height of a bottom of the first supporting surface from a bottom surface of the supporting member is different from a height of a bottom of the second supporting surface.

6. The adjustment module of claim 1, wherein the sliding member forms two sliding portions, and each guide rail defines a sliding groove; the sliding portions are received in the sliding grooves, respectively.

7. The adjustment module of claim 5, further comprising two protecting sleeves sleeved on the sliding portions of the sliding member.

8. The adjustment module of claim 5, further comprising a plurality of abrasion resistant sheets fixed on opposite sidewalls of the sliding grooves.

9. The adjustment module of claim 1, wherein the frame forms two side plates extending from opposite edges of the main plate, each side plate forming a limiting portion away from the main plate, and the guide rails are positioned between the limiting portions of the frame and the main plate of the frame.

10. The adjustment module of claim 1, wherein the supporting member forms a plurality of position pins, the frame comprises a supporting plate extending substantially perpendicularly from the main plate, and the supporting plate defines a plurality of position holes in which the position pins are received.

* * * * *